(12) United States Patent
Liu et al.

(10) Patent No.: US 11,526,473 B2
(45) Date of Patent: Dec. 13, 2022

(54) DATABASE UPGRADE IN A DISTRIBUTED DATABASE CLUSTER

(71) Applicant: International Business Machines Corporation, Armonk, NY (US)

(72) Inventors: Jing Jing Liu, Beijing (CN); Yun Zheng, Beijing (CN); Jing Wang, Beijing (CN); Zan Zhou, Beijing (CN); Peng Hui Jiang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 521 days.

(21) Appl. No.: 16/581,930

(22) Filed: Sep. 25, 2019

(65) Prior Publication Data

US 2021/0089504 A1 Mar. 25, 2021

(51) Int. Cl.
*G06F 16/21* (2019.01)
*G06N 5/04* (2006.01)
*G06F 16/23* (2019.01)
*G06F 16/27* (2019.01)

(52) U.S. Cl.
CPC .......... *G06F 16/21* (2019.01); *G06F 16/2365* (2019.01); *G06F 16/278* (2019.01); *G06N 5/04* (2013.01)

(58) Field of Classification Search
CPC .... G06F 16/21; G06F 16/278; G06F 16/2365; G06N 5/04
See application file for complete search history.

(56) References Cited

U.S. PATENT DOCUMENTS

| | | | |
|---|---|---|---|
| 8,326,800 B2 | 12/2012 | Cunningham | |
| 10,089,099 B2 | 10/2018 | Chang | |
| 2014/0372504 A1* | 12/2014 | Ben Dror | H04L 41/0816 709/202 |
| 2015/0142728 A1 | 5/2015 | Nigam | |
| 2016/0308855 A1* | 10/2016 | Lacey | H04L 67/10 |
| 2017/0235507 A1* | 8/2017 | Sinha | G06F 11/2069 711/114 |
| 2018/0241692 A1* | 8/2018 | Kumar | H04L 29/08243 |
| 2019/0243683 A1* | 8/2019 | Botelho | G06F 9/4881 |

* cited by examiner

*Primary Examiner* — Ashish Thomas
*Assistant Examiner* — Dustin D Eyers
(74) *Attorney, Agent, or Firm* — David B. Woycechowsky

(57) ABSTRACT

A database is selected from a plurality of databases included in the distributed database cluster. A shard map of the database is acquired, wherein the shard map includes a distribution of a plurality of shards on the plurality of nodes, and one or more nodes of the plurality of nodes each includes at least one shard of an old version of the database to be upgraded to a new version. A sustainable serviceability of the database corresponding to each of the one or more nodes is predicted according to the shard map based on the assumption that the at least one shard of each of the one or more nodes has been upgraded from the old version to the new version.

18 Claims, 6 Drawing Sheets

DATABASE UPGRADE IN A DISTRIBUTED DATABASE CLUSTER

BACKGROUND

The present invention relates to a distributed database cluster, and more specifically, to a database upgrade in a distributed database cluster.

A distributed database cluster includes multiple physical copies of the entire database which are kept synchronized. The distributed database cluster may include a set of computer nodes which may be located in the same physical location or may be dispersed over a network of interconnected computers. There are a large number of computer nodes at a distributed database cluster to provide data service. A plurality of databases are deployed on each computer node of the distributed database cluster.

SUMMARY

Embodiments of the present invention disclose methods, systems and computer program products. According to one embodiment of the present invention, a database is selected from a plurality of databases included in the distributed database cluster. A shard map of the database is acquired, wherein the shard map includes a distribution of a plurality of shards on the plurality of nodes, and one or more nodes of the plurality of nodes each includes at least one shard of an old version of the database to be upgraded to a new version. A sustainable serviceability of the database, corresponding to each of the one or more nodes, is predicted according to the shard map based on the assumption that at least one shard of each of the one or more nodes has been upgraded from the old version to the new version. A node corresponding to a maximum sustainable serviceability of the database is determined as a current node from the one or more nodes. Respective shards of the plurality of databases in the current node are upgraded to the new version.

According to an aspect of the present invention, there is a method, computer program product and/or system that performs the following operations (not necessarily in the following order): (i) selecting, by one or more processing units, a database from a plurality of databases included in the distributed database cluster; (ii) acquiring, by one or more processing units, a shard map of the database, wherein the shard map includes a distribution of a plurality of shards on a plurality of nodes in the distributed database cluster, and one or more nodes of the plurality of nodes each includes at least one shard of an old version of the database to be upgraded to a new version; (iii) predicting, by one or more processing units, a sustainable serviceability of the database corresponding to each of the one or more nodes according to the shard map based on the assumption that the at least one shard of each of the one or more nodes has been upgraded from the old version to the new version; (iv) determining, by one or more processing units, from the one or more nodes, a node corresponding to a maximum sustainable serviceability of the database as a current node; and (v) upgrading, by one or more processing units, respective shards of the plurality of databases in the current node to the new version.

BRIEF DESCRIPTION OF THE DRAWINGS

Through the more detailed description of some embodiments of the present invention in the accompanying drawings, the above and other objects, features and advantages of the present invention will become more apparent, wherein the same reference generally refers to the same components in the embodiments of the present invention.

DETAILED DESCRIPTION

Figure 1:
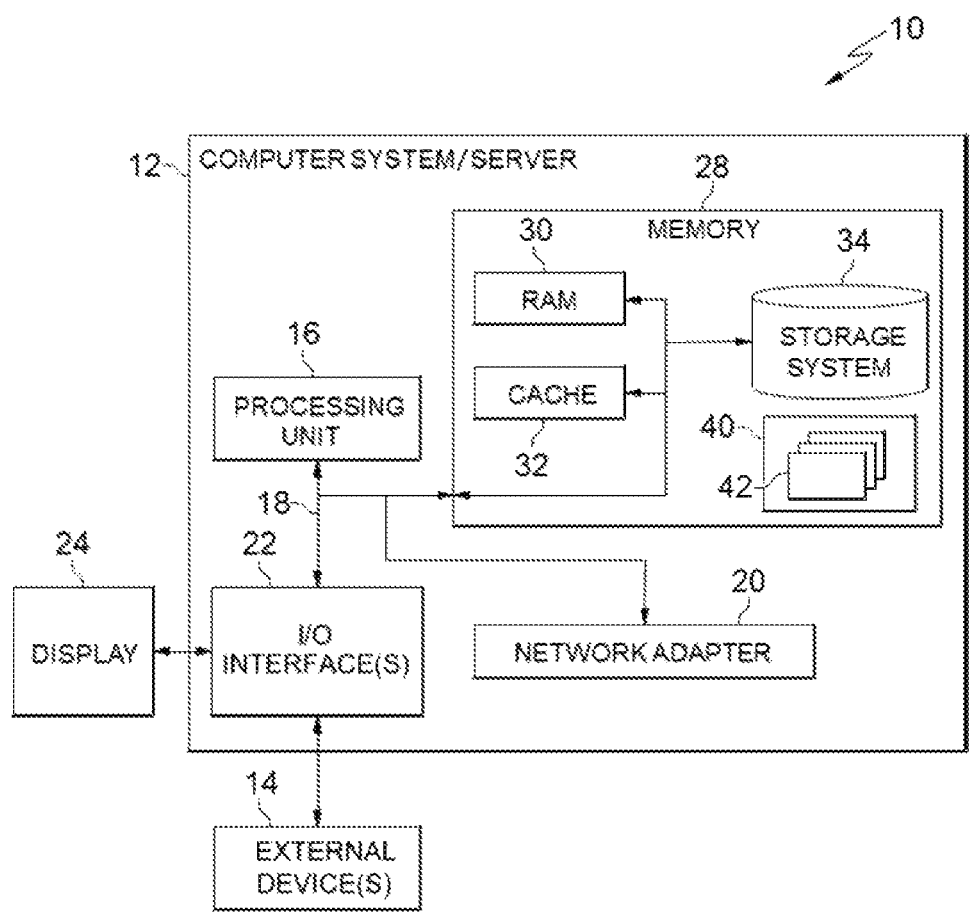
FIG. 1 depicts a cloud computing node according to an embodiment of the present invention.

Some embodiments will be described in more detail with reference to the accompanying drawings, in which the embodiments of the present invention have been illustrated. However, the present invention can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (for example, mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (for example, a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (for example, at least one) of program modules that are configured to carry out the functions of embodiments of the invention.

Program/utility 40, having a set (at least one) of program modules 42, may be stored in: (i) memory 28 (by way of example) without limitation; (ii) in an operating system; (iii) in one or more application programs; (iv) in other program modules; and/or in program data. Each of the operating systems (one or more application programs, other program modules, program data or some combination thereof) may include an implementation of a networking environment. Program modules 42 generally carries out the functions and/or methodologies of embodiments of the invention as described herein.

Computer system/server 12 may also communicate with one or more external devices 14 such as a keyboard, a pointing device, a display 24, one or more device that enables a user to interact with a computer system/server 12; and/or any device (for example, network card, modem, etc.) that enables computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (for example, the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID (redundant array of independent disks) systems, tape drives, and data archival storage systems, etc.

Figure 2:
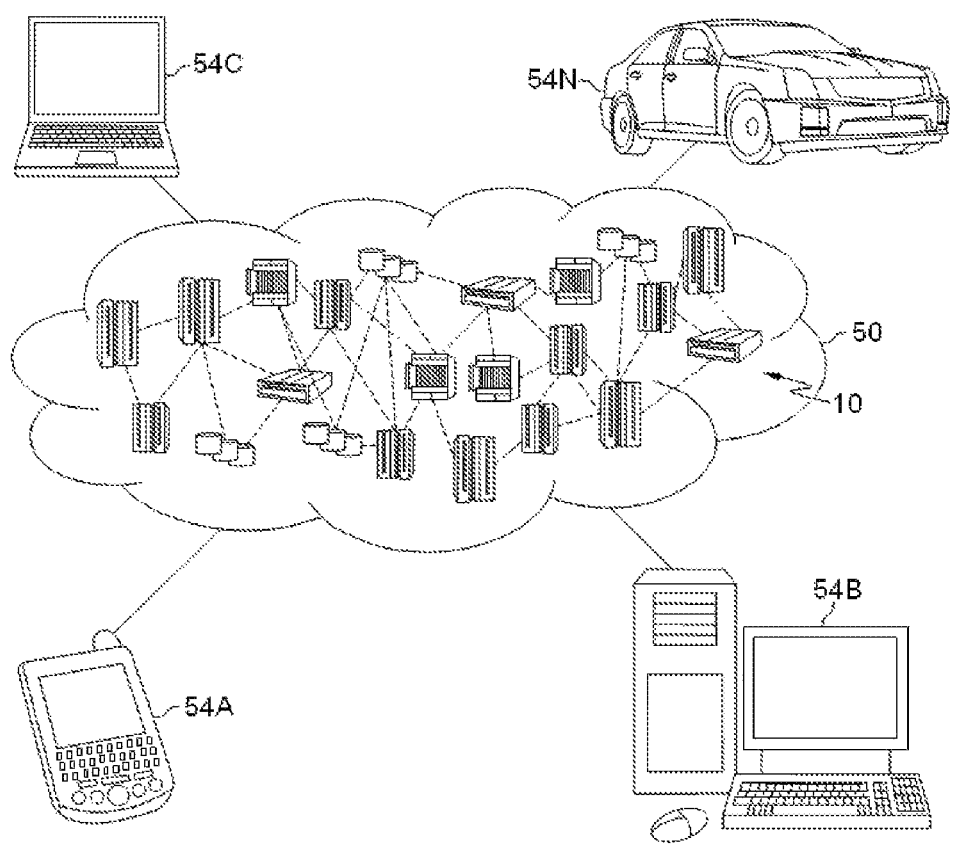
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with where local computing devices used by cloud consumers, such as a personal digital assistant (PDA) or cellular telephone 54A, a desktop computer 54B, a laptop computer 54C, and/or an automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (for example, using a web browser).

Figure 3:
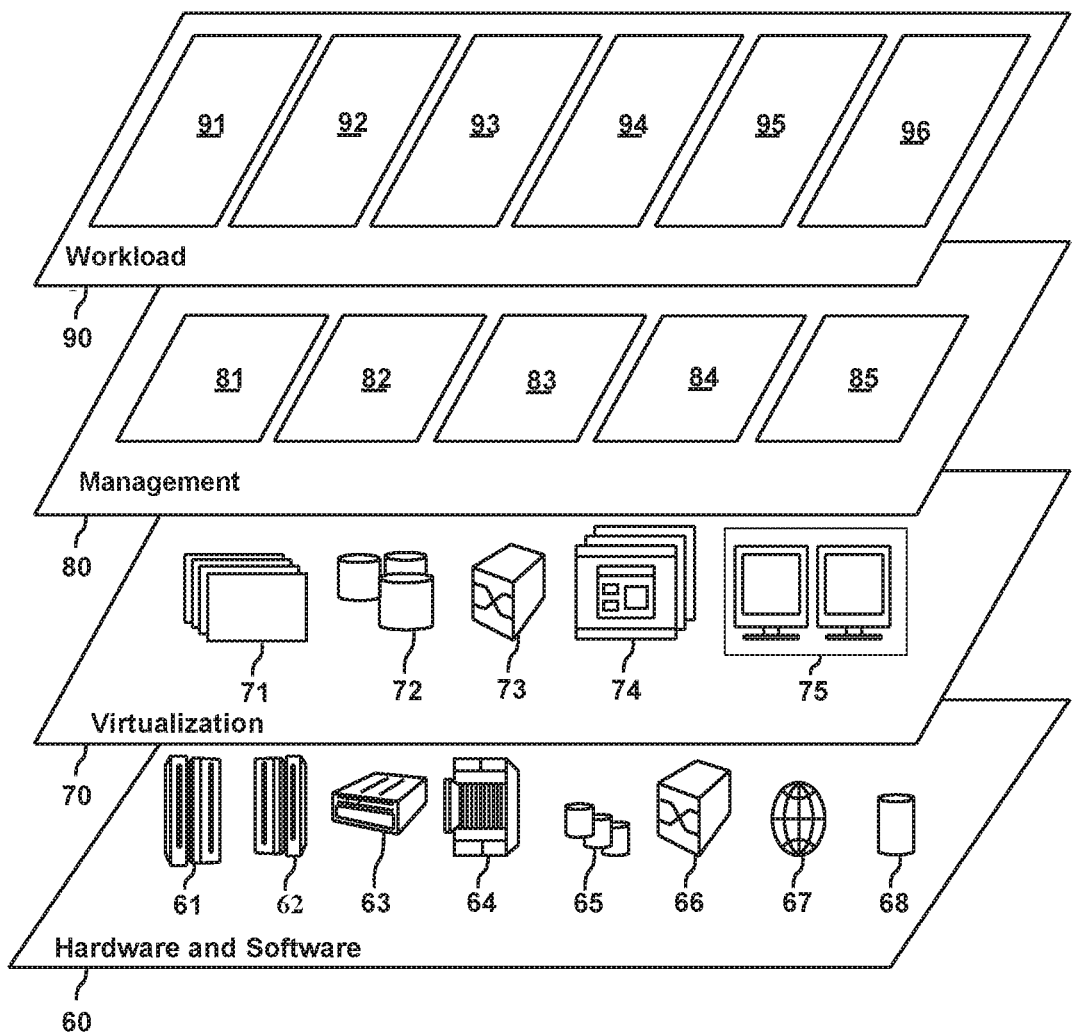
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted in FIG. 3, the layers described in the following paragraphs, and corresponding functions are provided:

Hardware and software layer 60 includes hardware and software components. Examples of hardware components include: mainframes 61; RISC (reduced instruction set computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking, where resources are utilized within the cloud computing environment and also billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and database upgrading 96.

As the amount of data for a single database is too large to manage, the data is separated into partitions called "shards". These shards and their copies are distributed on a plurality of nodes. Database upgrade is used quite often for nodes of the distributed database cluster to resolve known issues or apply new features especially in a cloud environment. Due to limitations of resources, only one node can proceed to perform database update at a time. Therefore, it would take a lot of time for all nodes of the distributed database cluster to complete a database upgrade. During database upgrade, shards of a database, in some nodes, are at a lower version, while shards of the database in other nodes are at a higher version. This would cause data inconsistency and loss if these nodes with different versions are used to deal with data requests. In a known solution, the plurality of nodes proceed a database upgrade in a random order. In this case, it is highly possible that the database cannot provide a complete data set for database requests for a long time. Therefore, it's desirable to reduce data loss and data inconsistency during node upgrades.

According to embodiments of the present invention, a new solution is proposed to reduce data loss and data inconsistency during database upgrade in the distributed database cluster. Instead of node upgrade in a random order, an order of node upgrade would be determined strategically to ensure a sustainable serviceability of a selected database. The sustainable serviceability of the selected database can be predicted based on a shard map of the selected database. According to the database upgrade strategy of the present invention, data loss and data inconsistency can be greatly reduced during database upgrade.

Figure 4:
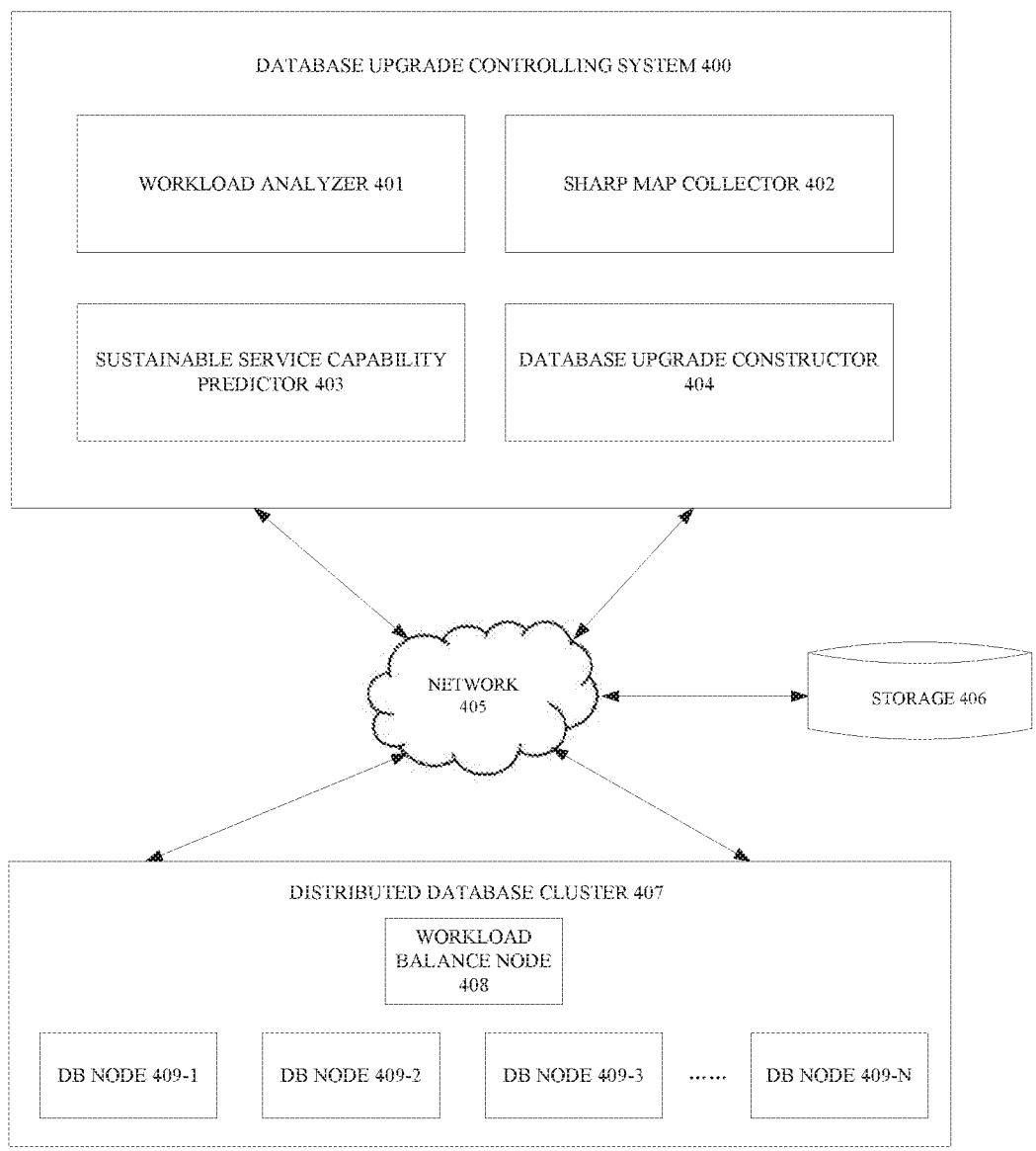
FIG. 4 depicts a database upgrade controlling system according to an embodiment of the present invention.

With reference now to FIG. 4, node upgrade controlling system (DUCS) 400, according to an embodiment of the present invention, is depicted. DUCS 400 includes workload analyzer 401, sharp map collector 402, sustainable serviceability predictor 403 and database upgrade constructor 404. DUCS 400 and distributed database cluster 407 can communicate with each other over network 405. Distributed database cluster 407 includes workload balance node 408 and a plurality of DB nodes 409-1, 409-2, 409-3 ... 409-N (collectively referred to as "nodes 409" or individually referred to as "node 409"). Workload balance node 408 can receive all requests to databases included in nodes 409 and route the requests to respective nodes 409 according to the workload of nodes 409. Workload balance node 408 can record the number of requests to respective databases and save the number of requests to respective databases in storage 406. The embodiments of the present invention will be described by referring to DUCS 400 in FIG. 4.

Figure 5:
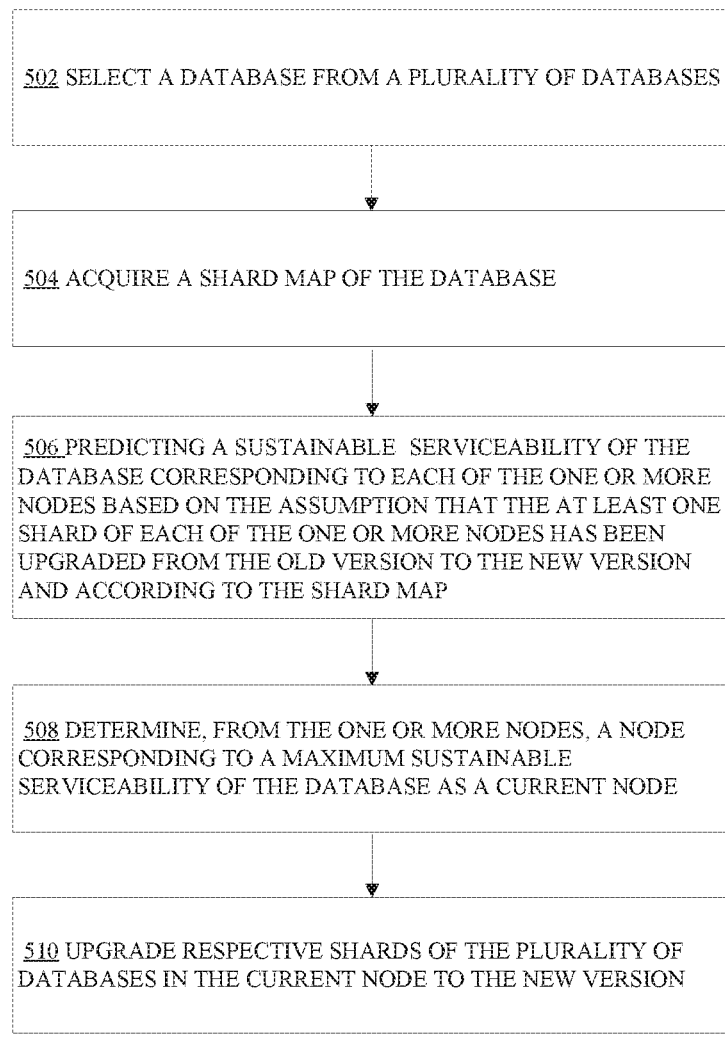
FIG. 5 depicts an example method for database upgrade in a distributed database cluster according to an embodiment of the present invention.

FIG. 5 depicts an example method 500 for database upgrading in a distributed database cluster according to an embodiment of the present invention. The method 500 can be implemented by DUCS 400. The method 500 comprises 502-510.

At 502, a database is selected from a plurality of databases. The plurality of databases are included in a plurality of nodes of the distributed database cluster. According to an embodiment, the database can be randomly selected from the plurality of databases. According to another embodiment, the database can be selected from the plurality of databases based on respective workloads of the plurality of databases.

According to embodiments of present invention, workload analyzer 401 can acquire respective workloads of the plurality of databases. A database with a most active workload can be selected from the plurality of databases. This means the selected database is a major and critical database. According to an embodiment, workload analyzer 401 can acquire the number of requests to respective databases from storage 406. A database with a maximum number of requests can be selected from the plurality of databases. According to another embodiment, workload analyzer 401 can acquire respective CPU usages for the plurality of databases from the distributed database cluster. A database with maximum CPU usage can be selected from the plurality of databases. According to a further embodiment, workload analyzer 401 can acquire respective network bandwidths for the plurality of databases from the distributed database cluster. A database with maximum network bandwidth can be selected from the plurality of databases.

It can be understood by the art that the workload for each database may include any combination of the number of requests to each database, a network bandwidth for each respective database and CPU usage of each respective database on the plurality of nodes.

At 504, a shard map of the selected database is acquired. The shard map comprises a distribution of a plurality of shards of the selected database on the plurality of nodes. The plurality of shards include a plurality of primary shards and replica shards thereof. The plurality of primary shards can constitute a complete data set for the selected database. A primary shard would be placed on a different node from nodes on which its corresponding replica shards are placed. A shard map can be constructed using lists of individual sharding key values, in other words, a hash-based shard map. A shard map can also be constructed using key range, in other words, range shard map. The shard map can specify a distribution of the plurality of shards on the plurality of nodes according to a certain field of a document (sharding key). Sharp map collector 402 can acquire a shard map of the selected database from distributed database cluster 407.

Table 1 depicts an example range shard map 1 of database A according to an embodiment of the present invention. In Table 1, the first row includes 10 DB nodes (N1, N2, ... N10) and the first column includes 6 key ranges. The key range is described by a pair [Low value, High value) where the Low value is the minimum key in a range, and the High value is the first value higher than the range. For example, the key range [0, 50) includes all integers greater than or equal to 0 and less than 50. As shown in Table 1, there are 6 key ranges including [0, 50), [50, 100), [100, 200), [200, 400), [400, 600) and [600, 700). The key range [0, 50) maps to shards A-1, A-2 and A-3. The key range [50, 100) maps to shards B-1, B-2 and B-3. The key range [100, 200) maps to shards C-1, C-2 and C-3. The key range [200, 400) maps to shards D-1, D-2 and D-3. The key range [400, 600) maps to shards E-1, E-2 and E-3. The key range [600, 700) maps to shards F-1, F-2 and F-3. The data included in the shards having a same key range are the same. That means that each shard can have two replica shards. For example, if shard A-1 is designated as a primary shard, then shard A-1 has replica shards A-2 and A-3. The shards having a same key range belong to one shard group, for example, shards A-1, A-2 and A-3. To meet requirement of fault tolerance, shards A-1, A-2 and A-3 are distributed on different DB nodes. For example, shard A-1 is distributed on DB Node 1, shard A-2 is distributed on DB Node 4 and shard A-3 is distributed on DB Node 8. A plurality of primary shards from respective shard groups can constitute a complete data set for a database. For example, shards A-1, B-2, C-1, D-3, E-3, F-2, designated as primary shards, can constitute a complete data set for database A.

TABLE 1

|            | N1  | N2  | N3  | N4  | N5  | N6  | N7  | N8  | N9  | N10 |
|------------|-----|-----|-----|-----|-----|-----|-----|-----|-----|-----|
| [0, 50)    | A-1 |     |     | A-2 |     |     |     | A-3 |     |     |
| [50, 100)  |     | B-1 |     |     |     | B-2 |     |     |     | B-3 |
| [100, 200) |     |     | C-1 | C-2 | C-3 |     |     |     |     |     |
| [200, 400) |     | D-1 |     |     | D-2 |     | D-3 |     |     |     |
| [400, 600) |     |     |     | E-1 |     |     |     | E-2 | E-3 |     |
| [600, 700) |     |     |     |     | F-1 |     |     | F-2 | F-3 |     |

According to an embodiment, one or more nodes of the plurality of nodes includes at least one shard of an old version of the database to be upgraded to a new version.

At 506, a sustainable serviceability of the database corresponding to each of the one or more nodes is predicted according to the shard map, based on the assumption that the at least one shard of each of the one or more nodes has been upgraded from the old version to the new version. Sustainable serviceability predictor 403 can implement the prediction of sustainable serviceability of the selected database.

According to an embodiment, the plurality of nodes can be divided into a first set and a second set. Each node of the first set includes at least one shard of an old version of the selected database, and each node of the second set includes at least one shard of a new version of the selected database. The first set has a first number of nodes, and the second set has a second number of nodes. According to an embodiment, a distributed database cluster includes 10 DB nodes. Assuming that each of DB Nodes 1, 2, 4, 5, 7, 8 includes at least one shard of an old version of the selected database, and each of DB Nodes 3, 6, 9, 10 includes at least one shard of a new version of the selected database. Therefore, DB Nodes 1, 2, 4, 5, 7, 8 belongs to the first set and DB Nodes 3, 6, 9, 10 belongs to the second set. During a database upgrade as nodes including the old version of the selected database are gradually upgraded, the number of nodes in the first set becomes smaller, and the number of nodes in the second set becomes greater.

According to an embodiment, the sustainable serviceability of the selected database includes a capability of the selected database providing the complete data set of the old version of the selected database and a capability of the selected database providing the complete data set of the new version of the selected database. According to an embodiment, the capability of the selected database providing the complete data set of the old version of the selected database can be determined based on a decreased speed away from the complete data set of the old version of the selected database. The capability of the selected database providing the complete data set of the new version of the selected database for can be determined based on an increased speed towards the complete data set of the new version of the selected database. That is, the lower the decreased speed away from the complete data set of the old version of the selected database is, the greater the capability of the selected database providing the complete data set of the old version of the database. In contrast, the greater the increased speed towards the complete data set of the new version of the selected database, the greater the capability of the selected database providing the complete data set of the new version of the database. According to an embodiment, the decreased speed away from the complete data set of the old version includes a reduced number of shard(s) the complete data set of the old version of the selected database, and an increased speed towards the complete data set of the new version includes an increased number of shard(s) in the complete data set of the new version of the selected database. The prediction at 510 would be proceeded for each node in the first set. That is, each node in the first set are traversed. So, the sustainable serviceability of the selected database corresponding to each node in the first set can be obtained.

At 508, a node corresponding to a maximum sustainable serviceability of the selected database is determined as a current node from the one or more nodes. According to an embodiment, database upgrade constructor 404 can determine a subset of the first set including at least one node corresponding to a maximum sustainable serviceability of the selected database. Then database upgrade constructor 404 can select a node from the subset as the current node.

At 510, respective shards of the plurality of databases in the current node are upgraded to the new version.

According to embodiments of present invention, instead of node upgrade in a random order, an order of node upgrade would be determined strategically to ensure a sustainable serviceability of a selected database. Normally, the selected database is a major and critical database. The order of node upgrade would be determined strategically to ensure a sustainable serviceability of the major and critical database. In this way, maximizing a sustainable serviceability of the major and critical database can provide better database services. Data loss and data inconsistency can be greatly reduced during database upgrade.

Figure 6:
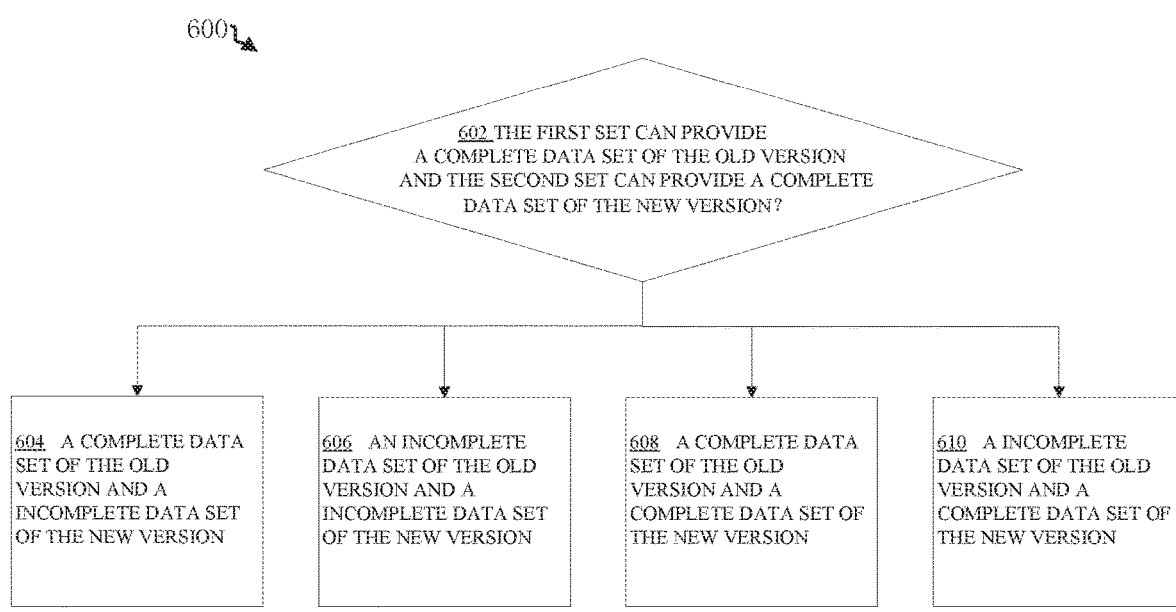
FIG. 6 depicts an example method for predicting a sustainable serviceability of a database according to an embodiment of the present invention.

FIG. 6 depicts an example method 600 for predicting a sustainable serviceability of a database according to an embodiment of the present invention.

At 602, it is determined whether the first set can provide a complete data set of the old version of the selected database and the second set can provide a complete data set of the new version of the selected database. That is, it is determined whether all shards included in the nodes of the first set can constitute a complete data set of the old version of the selected database, and whether all shards included in the nodes of the second set can constitute a complete data set of the new version of the selected database.

At 604, in response to determining that a plurality of shards in all nodes of the first set can provide a complete data set of the old version of the selected database and a plurality of shards in all nodes of the second set can provide an incomplete data set of the new version of the selected database, a decreased speed away from the complete data set of the old version of the selected database and an increased speed towards the complete data set of the new version of the selected database can be predicted. The capability of the selected database providing the complete data set of the old version of the selected database and the capability of the selected database providing the complete data set of the new version of the selected database can be predicted based on the predicted decreased speed away from the complete data set of the old version of the selected database and the predicted increased speed towards the complete data set of the new version of the selected database respectively.

According to an embodiment, DB nodes (N1, N2, . . . N10) include a plurality of databases. Database A is selected from the plurality of databases. Taking range shard map 1 in Table 1 for example, it is assumed that DB nodes (N1, N2, N4, N6, N8) include a plurality of shards of an old version V1 of the database A and DB nodes (N3, N5, N7, N9, N10) include a plurality of shards of a new version V2 of the database A. All shards of old version V1 of the database A in DB nodes (N1, N2, N4, N6, N8) are going to be upgraded to the new version V2. These 10 DB nodes are divided into two sets. The first set includes DB nodes (N1, N2, N4, N6, N8), and the second set includes DB nodes (N3, N5, N7, N9, N10). According to Table 1, the first set can provide shards A-1, A-2, A-3, B-1, B-2, C-2, D-1, E-2, F-1 and F-3. The second set can provide shards B-3, C-1, C-3, D-2, D-3, E-1, E-3 and F-2. It can be seen that the first set can provide a complete data set of the old version V1 of database A and the second set can provide an incomplete data set of the new version V2 of database A. In this case, for each respective node in the first set, a decreased speed away from the complete data set of the old version V1 of database A ($S_{V1}$) and an increased speed towards the complete data set of the new version V2 of database A ($S_{V2}$) can be predicted based on range shard map 1. By way of example, N 1 is selected to be a candidate node to be upgraded in a current round of upgrading. Supposing that all shards in N 1 have been upgraded to the new version V2, it can be predicated that shard A-1 would be added to the second data set of the new version V2 of database A. As shards A-2 and A-3 in the first set are the same as shard A-1, removing shard A-1 from the first set would not destroy the complete data set of the old version V1 of database A. The decreased speed away from the complete data set of the old version V1 of database A ($S_{V1}$) can be predicted to be 0 shard. At the same time, the newly added shard A-1 can make the incomplete data set of the new version V2 of database A become a complete data set. That is, the increased speed towards the complete data set of the new version V2 of database A ($S_{V2}$) can be predicted to be one shard. Then N2 is selected to be a candidate node to be upgraded in a current round of upgrading. Supposing that all shards in N 2 have been upgraded to the new version V2, it can be predicated that shards B-1 and D-1 would be added to the second data set of the new version V2 of database A. As shard B-2 in the first set is the same as shard B-1, removing shard B-1 from the first set would not destroy the complete data set of the old version V1 of database A. While shard D-1 has no replica shard in the first set, removing shard D-1 from the first set would destroy the complete data set of the old version V1. Therefore, the decreased speed away from the complete data set of the old version V1 of database A ($S_{V1}$) can be predicted to be one shard. As shards B-1 and D-1 have respective replica shards in the second set (in other words, shards B-3, D-2 and D-3), the increased speed towards the complete data set of V2 ($S_{V2}$) can be predicted to be 0 shard. In the same way, the decreased speed away from the complete data set of the old version V1 of database A ($S_{V1}$) and the increased speed towards the complete data set of the new version V2 of the database A ($S_{V2}$) for DB nodes N4, N6 and N8 can be predicted. The respective decreased speeds away from the complete data set of the old version V1 of database A ($S_{V1}$) and the increased speed towards the complete data set of V2 of database A ($S_{V2}$) for DB nodes N4, N6 and N8 can be recorded in Table 2.

TABLE 2

|  | N1 | N2 | N4 | N6 | N8 |
|---|---|---|---|---|---|
| $S_{V1}$ | 0 | 1 | 1 | 0 | 1 |
| $S_{V2}$ | 1 | 0 | 1 | 0 | 1 |

In the case of trying not to destroy the complete data set of the old version of database A, the greater the increased speed towards the complete set of the new version V2 of database A is, the greater the capability of the selected database providing the complete data set of the new version V2 of database A is. According to prediction results in Table 2, N1 can contribute one shard to the second data set of the new version V2 without destroying the complete data set of the old version V1 of database A. Therefore, N1 has a maximum sustainable serviceability of the old version V1 of database A and the new version V2 of database A. N1 can be selected to be a current node. The respective shards of the plurality databases are upgraded to the new version V2. N1 would be removed from the first set and be added to the second set after N1 has completed the database upgrade.

At 606, in response to determining that a plurality of shards in all nodes of the first set can provide an incomplete data set of the old version of the selected database and a plurality of shards in all nodes of the second set can provide an incomplete data set of the new version of the selected database, an increased speed towards the complete data set of the new version of the selected database can be predicted. The capability of the selected database providing the complete data set of the new version of the selected database can be predicted based on the predicted increased speed towards the complete data set of the new version of the selected database.

According to an embodiment, DB nodes (N1, N2, . . . N10) includes a plurality of databases. Database A is selected from the plurality of databases. taking range shard map 1 for example, it is assumed that DB nodes (N2, N6, N10) include a plurality of shards of an old version V1 of the database A and DB nodes (N1, N3, N4, N5, N7, N8, N9) include a plurality of shards of a new version V2 of the database A. All shards of the old version of database A in DB nodes (N2, N6, N10) are going to be upgraded to the new version V2. At first, these 10 DB nodes are divided into two sets. The first set includes DB nodes (N2, N6, N10), and the second set includes DB nodes (N1, N3, N4, N5, N7, N8, N9). According to Table 1, the first set can provide shards B-1, B-2, B-3 and D-1. The second set can provide shards A-1, A-2, A-3, C-1, C-2, C-3, D-2, D-3, E-1, E-2, E-3, F-1, F-2 and F-3. It can be seen that the first set can provide an incomplete data set of the old version V1 of database A and second set also can provide an incomplete data set of the new version V2 of database A. In this case, for each respective node in the first set, an increased speed towards the complete data set of the new version V2 of database A can be predicted based on range shard map 1. By way of example, N2 is selected to be a candidate node to be upgraded in a current round of upgrading. Supposing that all shards in N 2 have been upgraded to the new version V2, it can be predicated that shards B-1 and D-1 would have been added to the second set of the new version V2 of database A. In fact, as the second set of the new version V2 of database A has already included shards D-2 and D-3, newly added shard D-1 would not make the second set of the new version V2 become a complete data set of the new version V2 of database A. While the newly added shard B-1 can make the second set of the new version V2 of database A become a complete data set of the new version V2 of database A. That is, the increased speed towards the complete data set of the new version V2 of database A ($S_{V2}$) can be predicted to be one shard. Then, N6 is selected to be a candidate node to be upgraded in a current round of upgrading. Supposing that all shards in N6 have been upgraded to the new version V2, it can be predicated that shard B-2 would have been added to the second set of the new version V2. That is, the increased speed towards the complete data set of the new version V2 of database A ($S_{V2}$) can be predicted to be one shard. In the same way, the increased speed towards the complete data set of the new version V2 ($S_{V2}$) of database A for N10 can be predicted to be one shard. Table 3 shows the respective increased speeds towards the complete data set of the new version V2 of database A ($S_{V2}$) for N2, N6, N10.

TABLE 3

|  | N2 | N6 | N10 |
|---|---|---|---|
| $S_{V2}$ | 1 | 1 | 1 |

In this case, the greater the increased speed towards the complete set of the new version V2 of database A is, the greater the capability of the selected database providing the complete data set of the new version V2 of database A is. According to prediction results in Table 3, the increased speeds towards the complete data set of the new version V2 (SV2) for N2, N6, N10 are one shard. Therefore, any of N2, N6 and N10 can be selected to be a current node. The respective shards of the plurality databases in the current node can be upgraded to the new version V2.

At 608, in response to determining that a plurality of shards in all nodes of the first set can provide a complete data set of the old version of the selected database and a plurality of shards in all nodes of the second set can provide a complete data set of the new version of the selected database, a decreased speed away from the complete data set of the old version of the selected database can be predicted. The capability of the selected database providing the complete data set of the old version of the selected database can be predicted based on the predicted decreased speed away from the complete data set of the old version of the selected database.

According to an embodiment, DB nodes (N1, N2, . . . N10) include a plurality of databases. Database A is selected from the plurality of databases. Taking range shard map 1 for example, it is assumed that DB nodes (N4, N5, N6, N8, N9, N10) include a plurality of shards of an old version V1 of database A and DB nodes (N1, N2, N3, N7) include a plurality of shards of a new version V2 of the database A. All shards in DB nodes (N4, N5, N6, N8, N9, N10) are going to be upgraded to a new version V2 of database A. At first, these 10 DB nodes are divided into two sets. The first set includes DB nodes (N4, N5, N6, N8, N9, N10), and the second set includes DB nodes (N1, N2, N3, N7). According to Table 1, the first set can provide shards A-2, A-3, B-2, B-3, C-2, C-3, D-2, E-2, E-3, F-1 and F-3. The second set can provide shards A-1, B-1, C-1, D-1, D-3, E-1 and F-2. It can be seen that the first set can provide a complete data set of the old version V1 of database A and second set also can provide a complete data set of the new version V2 of database A. In this case, for each respective node in the first set, a decreased speed away from the complete data set of the old version V1 of database A can be predicted based on range shard map 1. By way of example, N4 is selected to be a candidate node to be upgraded in a current round of upgrading. Supposing that all shards in N4 have been upgraded to the new version V2, it can be predicated that shards A-2, C-2 and F-1 would be removed from the first set of the old version V1. However, removing shards A-2, C-2 and F-1 from the first set would not destroy the complete data set of the old version V1 because shards A-3, C-3 and F-3 are the replicas of shards A-2, C-2 and F-1 respectively. Therefore, the decreased number of the complete data set of V1 of database A is 0 shard. That is, a decreased speed away from the complete data set of the old version V1 of database A ($S_{V1}$) can be determined to be 0 shard. Then N5 is selected to be a candidate node to be upgraded in a current round of upgrading. Supposing that all shards in N 5 have been upgraded to the new version V2, it can be predicated that shards C-3 and D-2 would be removed from the first set of the old version V1. Removing shard D-2 from the first set leads to destroying the complete data set of the old version V1 of database A because there is no replica shard of shard D-2 in the first set. Therefore, the decreased number of the complete data set of the old version V1 of database A is one shard. That is, the decreased speed away from the complete data set of the old version V1 of database A ($S_{V1}$) is one shard. Next, N6, N8, N9 and N10 are selected to be a candidate node to be upgraded respectively. In the same way, the decreased speed away from the complete data set of the old version V1 of database A ($S_{V1}$) for N6, N8, N9 and N10 can be predicted. Table 4 shows the respective decreased speeds away from the complete data set of the old version V1 of database A ($S_{V1}$) for N4, N5, N6, N8, N9 and N10.

TABLE 4

|  | N4 | N5 | N6 | N8 | N9 | N10 |
|---|---|---|---|---|---|---|
| $S_{V1}$ | 0 | 1 | 0 | 0 | 0 | 0 |

In this case, as the second set can provide a complete data set of the new version V2 of database A before the current round of upgrading, the capability of the selected database providing the complete data set of the new version of the database is quite high. Therefore, it is not necessary to consider the capability of the selected database providing the complete data set of the new version V2 of the database in the current round of upgrading, but the capability of the selected database providing the complete data set of the old version V1 of the database needs to be considered. The smaller the decreased speed away from the complete set of the old version V1 of database A is, the greater the capability of the selected database providing the complete data set of the old version of database A is. According to the prediction results in Table 3, database upgrade of N4, N6, N8, N9, N10 can provide a minimum decreased speed away from the complete set of the old version V1 of database A. That is, removing any of N4, N6, N8, N9, N10 from the first set would not destroy the complete set of the old version V1 of database A. Therefore, any of N4, N6, N8, N9, N10 can be selected as a current node. For example, if N4 is selected to be a current node, the respective shards of the plurality databases in N4 can be upgraded to the new version V2.

At 610, in response to determining that a plurality of shards in all nodes of the first set can provide an incomplete data set of the old version of the selected database and a plurality of shards in all nodes of the second set can provide a complete data set of the new version of the selected database, a decreased speed away from the complete data set of the old version of the selected database can be predicted. The capability of the selected database providing the complete data set of the old version of the selected database can be predicted based on the predicted decreased speed away from the complete data set of the old version of the selected database.

According to an embodiment, DB nodes (N1, N2, . . . N10) include a plurality of databases. Database A is selected from the plurality of databases. Taking range shard map 1 for example, it is assumed that DB nodes (N5, N6, N9, N10) include a plurality of shards of an old version V1 of database A and DB nodes (N1, N2, N3, N4, N7, N8) include a plurality of shards of a new version V2 of database A. All shards in DB nodes (N5, N6, N9, N10) are going to be upgraded to a new version V2. At first, these 10 DB nodes are divided into two sets. The first set includes DB nodes (N5, N6, N9, N10), and the second set includes DB nodes (N1, N2, N3, N4, N7, N8). According to Table 1, the first set can provide shards B-2, B-3, C-3, D-2, E-3. The second set can provide shards A-1, A-2, A-3, B-1, C-1, C-2, D-1, D-3, E-1, E-2, F-1, F-2 and F-3. It can be seen that the first set provides an incomplete data set of the old version V1 of database A and a second set can provide a complete data set of the new version V2 of database A. In this case, for each respective node in the first set, a decreased speed away from the complete data set of the old version V1 of database A can be predicted based on range shard map 1. By way of example, N5 is selected to be a candidate node to be upgraded in a current round of upgrading. Supposing that all shards in N5 have been upgraded to the new version V2, it can be predicated that shards C-3 and D-2 would be removed from the first data set of the old version V1. Therefore, the decreased speed away from the complete data set of the old version V1 of database A ($S_{V1}$) can be predicted to be two shards. Next, N6 is selected to be a candidate node to be upgraded in a current round of upgrading. Supposing that all shards in N6 have been upgraded to the new version V2, it can be predicated that shard B-2 would be removed from the first set of V1. Therefore, the decreased speed away from the complete data set of the old version of database A V1 ($S_{V1}$) is predicted to be one shard. Next, N9 and N10 are selected to be a candidate node to be upgraded respectively. In the same way, the decreased speed away from the complete data set of the old version V1 of database A ($S_{V1}$) for N9 and N10 can be predicted. Table 4 shows the respective decreased speeds away from the complete data set of the old version V1 of database A ($S_{V1}$) for N5, N6, N9 and N10.

TABLE 5

|  | N5 | N6 | N9 | N10 |
|---|---|---|---|---|
| $S_{V1}$ | 2 | 1 | 1 | 1 |

In this case, as the second set can provide a complete data set of the new version V2 of database A before the current round of upgrading, the capability of the selected database providing the complete data set of the new version of the database is quite high. Therefore, it is not necessary to consider the capability of the selected database providing the complete data set of the new version V2 of the database in the current round of upgrading, but the capability of the selected database providing the complete data set of the old version V1 of the database needs to be considered. The greater the decreased speed away from the complete set of the old version V1 of database A is, the greater the capability of the selected database providing the complete data set of the old version of database A is. According to the prediction results in Table 4, database upgrade of N5 can provide a maximum decreased speed away from the complete set of the old version V1. Therefore, N5 is selected as a current node. The respective shards of the plurality databases in N5 can be upgraded to the new version V2.

It should be noted that the computer-implemented method of database upgrading in a distributed database cluster (or achieved by a computer-implemented system for database upgrading in a distributed database cluster) according to embodiments of this disclosure could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for database upgrading in a distributed database cluster, the method comprising:
    selecting, by one or more processing units, a database from a plurality of databases included in the distributed database cluster;
    acquiring, by one or more processing units, a shard map of the database, wherein the shard map includes a distribution of a plurality of shards on a plurality of nodes in the distributed database cluster, and one or more nodes of the plurality of nodes each includes at least one shard of an old version of the database to be upgraded to a new version;
    predicting, by one or more processing units, a sustainable serviceability of the database corresponding to each of the one or more nodes according to the shard map based on the assumption that the at least one shard of each of the one or more nodes has been upgraded from the old version to the new version; and
    determining, by one or more processing units, from the one or more nodes, a node corresponding to a maximum sustainable serviceability of the database as a current node; and
    upgrading, by one or more processing units, respective shards of the plurality of databases in the current node to the new version;
    wherein the sustainable serviceability of the database includes:
        a capability of the database providing the complete data set of the old version the database, and
        a capability of the database providing the complete data set of the new version of the database; and
    wherein the capability of the database providing the complete data set of the old version of the database is determined based on a decreased speed away from the complete data set of the old version of the database, and the capability of the database providing the complete data set of the new version of the database is determined based on an increased speed towards the complete data set of the new version of the database.

2. The method of claim 1, wherein the selecting the database from the plurality of databases comprises:
    acquiring, by one or more processing units, a workload of each respective database of the plurality of databases; and
    selecting, by one or more processing units, the database with a most active workload from the plurality of databases.

3. The method of claim 2, wherein the workload for each respective database includes at least one of:
    a number of requests to each respective database,
    a network bandwidth for each respective database, and
    CPU usage of each respective database on the plurality of nodes.

4. The method of claim 1, further comprising:
    dividing, by one or more processing units, the plurality of nodes into a first set and a second set, wherein the first set includes the one or more nodes, and the second set includes one or more nodes including at least one shard of the new version of the database.

5. The method of claim 4, wherein the predicting the sustainable serviceability of the database according to the shard map comprises:
    in response to determining that a plurality of shards in all nodes of the first set can provide a complete data set of the old version of the database and a plurality of shards in all nodes of the second set can provide an incomplete data set of the new version of the database, predicting a decreased speed away from the complete data set of the old version of the database and an increased speed towards the complete data set of the new version of the database; and
    predicting the capability of the database providing the complete data set of the old version of the database and the capability of the database providing the complete data set of the new version of the database based on the predicted decreased speed away from the complete data set of the old version of the database and the predicted increased speed towards the complete data set of the new version of the database respectively.

6. The method of claim 4, wherein the predicting the sustainable serviceability of the database according to the shard map comprises:

in response to determining that a plurality of shards in all nodes of the first set can provide an incomplete data set of the old version of the database and a plurality of shards in all nodes of the second set can provide an incomplete data set of the new version of the database, predicting an increased speed towards the complete data set of the new version of the database; and predicting the capability of the database providing the complete data set of the new version of the database based on the predicted increased speed towards the complete data set of the new version of the database.

7. A computer program product for database upgrading in a distributed database cluster, the computer program product comprising:

a set of storage device(s); and computer code stored collectively in the set of storage device(s), with the computer code including data and instructions to cause a processor(s) set to perform at least the following operations:

selecting, by one or more processing units, a database from a plurality of databases included in the distributed database cluster, acquiring, by one or more processing units, a shard map of the database, wherein the shard map includes a distribution of a plurality of shards on a plurality of nodes in the distributed database cluster, and one or more nodes of the plurality of nodes each includes at least one shard of an old version of the database to be upgraded to a new version, predicting, by one or more processing units, a sustainable serviceability of the database corresponding to each of the one or more nodes according to the shard map based on the assumption that the at least one shard of each of the one or more nodes has been upgraded from the old version to the new version, and determining, by one or more processing units, from the one or more nodes, a node corresponding to a maximum sustainable serviceability of the database as a current node, and upgrading, by one or more processing units, respective shards of the plurality of databases in the current node to the new version, wherein the sustainable serviceability of the database includes:

a capability of the database providing the complete data set of the old version the database, and a capability of the database providing the complete data set of the new version of the database; and wherein the capability of the database providing the complete data set of the old version of the database is determined based on a decreased speed away from the complete data set of the old version of the database, and the capability of the database providing the complete data set of the new version of the database is determined based on an increased speed towards the complete data set of the new version of the database.

8. The computer program product of claim 7, wherein the selecting the database from the plurality of databases comprises:

acquiring, by one or more processing units, a workload of each respective database of the plurality of databases; and selecting, by one or more processing units, the database with a most active workload from the plurality of databases.

9. The computer program product of claim 8, wherein the workload for each respective database includes at least one of:

a number of requests to each respective database, a network bandwidth for each respective database, and CPU usage of each respective database on the plurality of nodes.

10. The computer program product of claim 7, wherein the computer code further includes instructions for causing the processor(s) set to perform the following operation(s):

dividing, by one or more processing units, the plurality of nodes into a first set and a second set, wherein the first set includes the one or more nodes, and the second set includes one or more nodes including at least one shard of the new version of the database.

11. The computer program product of claim 10, wherein the predicting the sustainable serviceability of the database according to the shard map comprises:

in response to determining that a plurality of shards in all nodes of the first set can provide a complete data set of the old version of the database and a plurality of shards in all nodes of the second set can provide an incomplete data set of the new version of the database, predicting a decreased speed away from the complete data set of the old version of the database and an increased speed towards the complete data set of the new version of the database; and predicting the capability of the database providing the complete data set of the old version of the database and the capability of the database providing the complete data set of the new version of the database based on the predicted decreased speed away from the complete data set of the old version of the database and the predicted increased speed towards the complete data set of the new version of the database respectively.

12. The computer program product of claim 10, wherein the predicting the sustainable serviceability of the database according to the shard map comprises:

in response to determining that a plurality of shards in all nodes of the first set can provide an incomplete data set of the old version of the database and a plurality of shards in all nodes of the second set can provide an incomplete data set of the new version of the database, predicting an increased speed towards the complete data set of the new version of the database; and predicting the capability of the database providing the complete data set of the new version of the database based on the predicted increased speed towards the complete data set of the new version of the database.

13. A computer system for database upgrading in a distributed database cluster, the computer system comprising:

a processor(s) set;

a set of storage device(s); and computer code stored collectively in the set of storage device(s), with the computer code including data and instructions to cause the processor(s) set to perform at least the following operations:

selecting, by one or more processing units, a database from a plurality of databases included in the distributed database cluster, acquiring, by one or more processing units, a shard map of the database, wherein the shard map includes a distribution of a plurality of shards on a plurality of nodes in the distributed database cluster, and one or more nodes of the plurality of nodes each includes at least one shard of an old version of the database to be upgraded to a new version, predicting, by one or more processing units, a sustainable serviceability of the database corresponding to each of the one or more nodes according to the shard map based on the assumption that the at least one shard of each of the one or more nodes has been upgraded from the old version to the new version, and determining, by one or more processing units, from the one or more nodes, a node corresponding to a maximum sustainable serviceability of the database as a current node, and upgrading, by one or more processing units, respective shards of the plurality of databases in the current node to the new version, wherein the sustainable serviceability of the database includes:

a capability of the database providing the complete data set of the old version the database, and a capability of the database providing the complete data set of the new version of the database; and wherein the capability of the database providing the complete data set of the old version of the database is determined based on a decreased speed away from the complete data set of the old version of the database, and the capability of the database providing the complete data set of the new version of the database is determined based on an increased speed towards the complete data set of the new version of the database.

14. The computer system product of claim 13, wherein the selecting the database from the plurality of databases comprises:

acquiring, by one or more processing units, a workload of each respective database of the plurality of databases; and selecting, by one or more processing units, the database with a most active workload from the plurality of databases.

15. The computer system of claim 14, wherein the workload for each respective database includes at least one of:

a number of requests to each respective database, a network bandwidth for each respective database, and CPU usage of each respective database on the plurality of nodes.

16. The computer system of claim 13, wherein the computer code further includes instructions for causing the processor(s) set to perform the following operation(s):

dividing, by one or more processing units, the plurality of nodes into a first set and a second set, wherein the first set includes the one or more nodes, and the second set includes one or more nodes including at least one shard of the new version of the database.

17. The computer system of claim 16, wherein the predicting the sustainable serviceability of the database according to the shard map comprises:

in response to determining that a plurality of shards in all nodes of the first set can provide a complete data set of the old version of the database and a plurality of shards in all nodes of the second set can provide an incomplete data set of the new version of the database, predicting a decreased speed away from the complete data set of the old version of the database and an increased speed towards the complete data set of the new version of the database; and predicting the capability of the database providing the complete data set of the old version of the database and the capability of the database providing the complete data set of the new version of the database based on the predicted decreased speed away from the complete data set of the old version of the database and the predicted increased speed towards the complete data set of the new version of the database respectively.

18. The computer system of claim 16, wherein the predicting the sustainable serviceability of the database according to the shard map comprises:

in response to determining that a plurality of shards in all nodes of the first set can provide an incomplete data set of the old version of the database and a plurality of shards in all nodes of the second set can provide an incomplete data set of the new version of the database, predicting an increased speed towards the complete data set of the new version of the database; and predicting the capability of the database providing the complete data set of the new version of the database based on the predicted increased speed towards the complete data set of the new version of the database.

* * * * *